United States Patent [19]

Spiers

[11] 4,113,160

[45] Sep. 12, 1978

[54] SHEET SLING

[76] Inventor: Dennis D. Spiers, 2688 N. 650 E., Ogden, Utah 84404

[21] Appl. No.: 759,078

[22] Filed: Jan. 13, 1977

[51] Int. Cl.² ............................................. B65G 7/12
[52] U.S. Cl. .................................. 224/45 R; 294/15; 294/26
[58] Field of Search .............. 224/45 T, 45 P, 45 R, 224/49; 294/15, 19 R, 26, 34; 24/73 HH, 73 A, 205.15 H; 16/110 R, 114 R, 114 B, 124

[56] References Cited

U.S. PATENT DOCUMENTS

| | | | |
|---|---|---|---|
| 2,428,941 | 10/1947 | Packard | 224/45 |
| 2,542,621 | 2/1951 | Bober | 294/34 |
| 2,770,484 | 11/1956 | Lunsford | 294/78 R X |
| 3,630,475 | 12/1971 | Barry | 224/45 T |
| 3,672,004 | 6/1972 | Smith | 24/73 HH |

FOREIGN PATENT DOCUMENTS 711,169 6/1954 United Kingdom ................... 224/45 P

*Primary Examiner*—Drayton E. Hoffman
*Assistant Examiner*—Donald W. Underwood
*Attorney, Agent, or Firm*—M. Wayne Western

[57] ABSTRACT

An adjustable hand held carrier for large sheets of board such as plywood, plasterboard, paneling, fiberboard and the like comprising two pieces of substantially the same dimensions being adjustably joined together by fastening means extending through longitudinal slots in overlapping ends of said carrier, said pieces extending oppositely from each other and being backwardly facing, the outer end of each piece terminating in a tray shaped configuration.

5 Claims, 3 Drawing Figures

SHEET SLING

BACKGROUND OF THE INVENTION

This invention relates to an adjustable hand held carrier for large boards. More particularly this invention relates to an adjustable carrier having oppositely facing lips or trays at either end.

In the building profession it is necessary to transport relatively large sheets of material from the delivery site to the place such sheets are to be used. Sheets such as plywood are used for flooring, roofing, siding and to make concrete forms. Plasterboard sheets are used for interior walls or sheets of paneling. These sheets may be four feet by eight feet or perhaps even larger. Because of their dimensions they are often difficult to handle. When using two hands to carry a sheet one's vision is often blocked or impaired thus causing the person carrying a sheet to run into or stumble over unseen objects. On the other hand, when two persons carry a sheet the cost of labor is increased thereby raising construction costs. It is to be emphasized that it is not the weight of the sheets but their size that cause them to be difficult to handle.

OBJECTS AND BRIEF DESCRIPTION OF THE INVENTION

It is an object of this invention to provide a carrier for various types of board whereby the board may be carried by one hand without materially obstructing the view of the carrier.

It is another object of the present invention to provide a carrier having substantially identical oppositely facing ends one of which will serve as a tray in which to balance one side of a board and the other of which will serve as a handle or grip.

A still different object of the inventin is to provide a carrier which is adjustable according to the height and arm length of the carrier.

These and other objects may be accomplished by means of a carrier consisting of two pieces of substantially identical dimensions. Each piece consists of a relatively narrow end containing a longitudinal slot, and a wider end terminating with lip or tray formed by the outward and backward extension of said ends. The carrier is assembled by placing the wider ends in oppositely facing, and oppositely extending directions and overlapping the narrow ends such that at least a portion of the longitudinal slots in each piece are in alignment. Fastening means, such as bolts, are inserted through the longitudinal slots in the overlapping ends and tightened to secure the two pieces. By balancing one end or side of a sheet in the tray at one end of the carrier facing inwardly and placing an arm over the top of the sheet and grasping the outwardly facing end a sheet of building material may be easily carried by the use of one hand from one site to another. The inside face of the material being carried may rest against the body of the person and the outside face may rest against the carrier and inside arm portion of the person.

DRAWINGS OF THE INVENTION

DETAILED DESCRIPTION OF THE INVENTION

Figure 1:
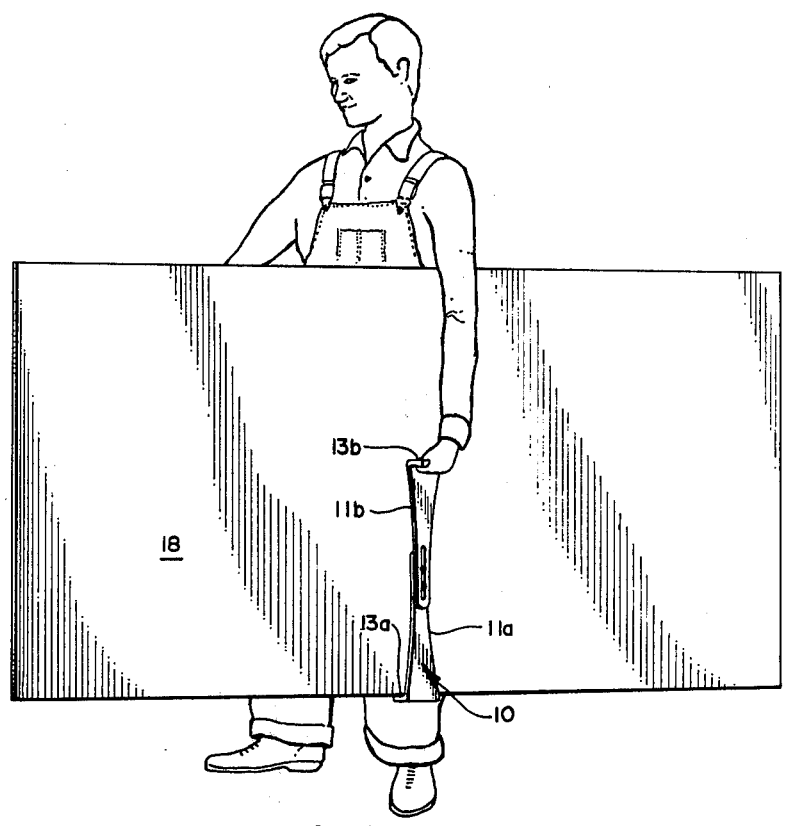
FIG. 1 is a perspective view of the invention showing the application thereof.
Figure 2:
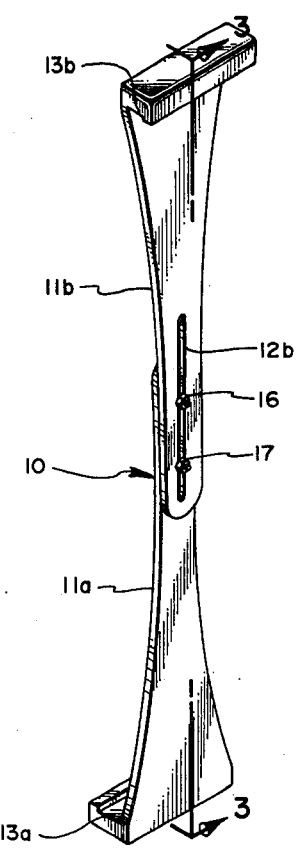
FIG. 2 is an enlarged perspective view of the carrier illustrating both pieces assembled together.
Figure 3:
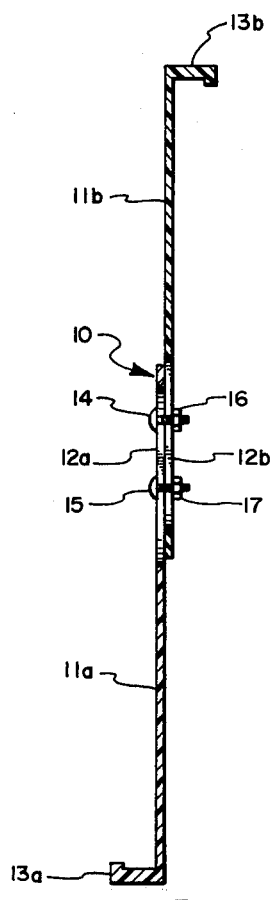
FIG. 3 is a longitudinal cross sectional view taken along lines 3—3 of FIG. 2.

There is shown in FIGS. 1, 2 and 3 a complete operative embodiment of the invention. The carrier 10 consists of two pieces 11a and 11b of substantially the same dimensions. One end of pieces 11a and 11b is preferably smaller than the other and each contains a longitudinal slot 12a and 12b. The opposite end of each piece contains a tray 13a and 13b consisting of outwardly and backwardly extending portions as illustrated. Tray 13a and 13b is of a width sufficient to hold a piece of plywood, plasterboard, mattress, glass, metal or any other sheet material or to serve as a hand grip as illustrated in FIG. 1. As illustrated each piece 11a and 11b is both oppositely extending and backwardly facing with the tray ends 13a and 13b extending outwardly. The ends containing the longitudinal slots 12a and 12b overlap such that at least a portion of the slots are in alignment. Fastening means represented by threaded bolts 14 and 15 extend through longitudinal slots 12a and 12b and are secured by nuts 16 and 17. The height or length of carrier 10 may be adjusted by loosening nuts 16 and 17 and sliding the pieces 11a and 11b further apart to provide minimum overlap and lengthen the carrier or by providing maximum overlap thus shortening the carrier. When nuts 16 and 17 are tightened the two pieces are held firmly in place in the desired position.

Obviously variations may be made in the carrier without departing from the scope of the invention. For example slot 12a could be changed and consist of two holes through which bolts 14 and 15 could be inserted thus making piece 11b adjustable relative to piece 11a. While tray end 13a or 13b is generally wider than the slot ends other dimensions could be used. Also one end 13a could specifically form a tray while the other end 13b could be a hand grip. The advantage of having both ends 13a and 13b the same is obvious since it will not matter which end is used to engage the sheet of material and which end is to be used as a hand grip.

The usage of the carrier is aptly shown in FIG. 1. A board or sheet of material 18 is placed in tray 13a the position being adjusted until the sheet of material 18 is balanced, i.e., will not tip forward or backward. The person carrying the sheet 18 puts his arm over the top of the sheet 18 and grasps tray or grip 13b. The sheet 18 is prevented from falling sideways by the body of the person on one side and the person's arm and carrier on the other side.

The carrier 10 may be made of any suitable material such as a metal, high impact plastic, hardwood or the like. From the above it may readily be seen how one may easily and efficiently carry relatively large sheets of building material from one site to another.

Although the invention as has been described is deemed to be that which would form the preferred embodiment of the invention, it is recognized that departures may be made therefrom without departing from the scope of the invention which is not to be limited to the details disclosed, but is to be accorded the full scope of the claims so as to include all and equivalent devices.

I claim:

1. An adjustable hand held carrier for transporting sheets of material comprising two adjustable pieces having substantially the same dimensions being adjustably secured together in backwardly facing and extending positions thereby having similar adjoining ends and similar opposing ends, said adjoining ends containing longitudinal slots therein and being overlapped in such a manner that the longitudinal slots are in adjustable alignment and secured together in a fixed relationship by fastening means extending through the slots, said opposing ends terminating in a tray configuration.

2. An adjustable carrier according to claim 1 wherein the opposing ends are wider than the adjoining ends.

3. An adjustable carrier according to claim 2 wherein the width of the tray is at least as wide as the width of the material being carried.

4. An adjustable carrier according to claim 1 wherein the fastening meeans consists of at least two nuts and bolts.

5. An adjustable carrier according to claim 4 wherein the adjustable pieces are interchangeable.

* * * * *